UNITED STATES PATENT OFFICE.

JAMES P. ELLIOTT, OF CHICAGO, ILLINOIS.

CORE AND METHOD OF MAKING THE SAME.

1,285,081.

Specification of Letters Patent.

Patented Nov. 19, 1918.

No Drawing.

Application filed March 25, 1918. Serial No. 224,528.

*To all whom it may concern:*

Be it known that I, JAMES P. ELLIOTT, a citizen of the United States, residing at Chicago, county of Cook, and State of Illinois, have invented a certain new and useful Improvement in Cores and Methods of Making the Same, and declare the following to be a full, clear, and exact description of the same, such as will enable others skilled in the art to which it pertains to make and use the same.

Formerly the cores used in foundries were made of a core sand held together by a starch compound paste, compounds of molasses and, in fact, any adhesive material which would hold the core in shape temporarily and harden and set when dried. These old adhesive compounds or core oils as they are called have been largely superseded by substances such as linseed oil which will permit the cores to be completed quickly by being dried in a baking or hot drying room. Linseed oil is an ideal core compound because it is readily oxidized by heat and thereby becomes a strong and firm adhesive material when mixed with sand. Another material having the desirable characteristics of great adhesiveness and capacity for quick drying is asphalt. Heretofore asphalt has been used in an oily state in the same manner as linseed oil but it has not been able to displace linseed oil because the asphalt is a difficult and disagreeable substance to work with in the oily state.

The object of the present invention is to produce a method of making cores which will permit the use of asphalt as a core compound in such a manner as to secure the benefit of the desirable characteristics of the asphalt without retaining the objectionable characteristics which have prevented it from being widely used.

In accordance with my invention I utilize the asphalt in a comminuted or powdered form which will be dry and have no adhesive properties at ordinary temperature, combining with the dry asphalt and the core sand or any other suitable body-forming material a suitable saturating fluid or other element adapted to serve as a temporary binder to permit a core to be shaped and held in shape while the drying or baking occurs; the asphalt being made to have such a melting point that it will melt at the temperature of the drying or baking room and will form a permanent binder in the core. For the temporary binder liquid products of petroleum or a gummy adhesive mixture of vegetable matter and water such, for instance, as a flour and water paste, may be employed, although it will of course be understood that any suitable and sufficiently cheap adhesive material may be utilized for this purpose.

I claim:

1. The process of making cores which consists in molding a mixture of dry comminuted asphalt and a body material held together by a temporary binder, and then heating the core to a temperature sufficient to melt the asphalt.

2. A plastic core composition comprising a mixture of comminuted dry asphalt, a body material and a temporary binder.

In testimony whereof I sign this specification.

JAMES P. ELLIOTT.